United States Patent [19]

Mercure

[11] 4,145,138
[45] Mar. 20, 1979

[54] METHODS OF AND APPARATUS FOR PHOTOGRAPHING PAGES OF A BOOK

[76] Inventor: Gerald Mercure, 38 Duchesne St., Rimouski, Quebec, Canada

[21] Appl. No.: 821,832

[22] Filed: Aug. 4, 1977

[30] Foreign Application Priority Data

Aug. 5, 1976 [CH] Switzerland ............... 10112/76

[51] Int. Cl.² .................. G03B 27/32; G03B 27/52
[52] U.S. Cl. ........................... 355/25; 354/80; 354/121; 354/150; 355/43; 355/65; 355/77
[58] Field of Search ............. 355/21, 25, 43, 65, 355/66, 77; 354/80, 121, 150, 160

[56] References Cited

U.S. PATENT DOCUMENTS

| | | | |
|---|---|---|---|
| 1,941,624 | 1/1934 | Salchow | 355/25 |
| 3,049,966 | 8/1962 | Gruner | 354/160 X |
| 3,286,586 | 11/1966 | Whitney | 354/160 X |
| 3,894,800 | 7/1975 | Rotter | 355/66 X |

*Primary Examiner*—Richard A. Wintercorn
*Attorney, Agent, or Firm*—Schwartz, Jeffery, Schwaab, Mack, Blumenthal & Koch

[57] ABSTRACT

Methods of and apparatus for photographing pages of a book, which is stitched and bound so as to form a seam separating adjacent sequential pages, enable one to photograph the book on a strip of film with the pages sequentially ordered and oriented in the same direction. Essentially, the apparatus for practicing the method includes a camera which is mounted on a housing that has a hollow member with an aperture or opening that fits over a single page of the book. The camera is mounted for rotation relative to the housing so that after one page is photographed, the camera may be rotated 180° to maintain the orientation of the film strip in the same direction as the first page when the housing and book are rotated relative to one another through 180° to register a subsequent page with the housing. Rotation of the housing and book relative to one another may be accomplished by holding the housing still and rotating the book 180° or by holding the book still and rotating the housing 180°. The housing includes a flash unit therein which lights the page of the book being photographed and a set of mirrors for reflecting light onto the page and into the camera.

26 Claims, 17 Drawing Figures

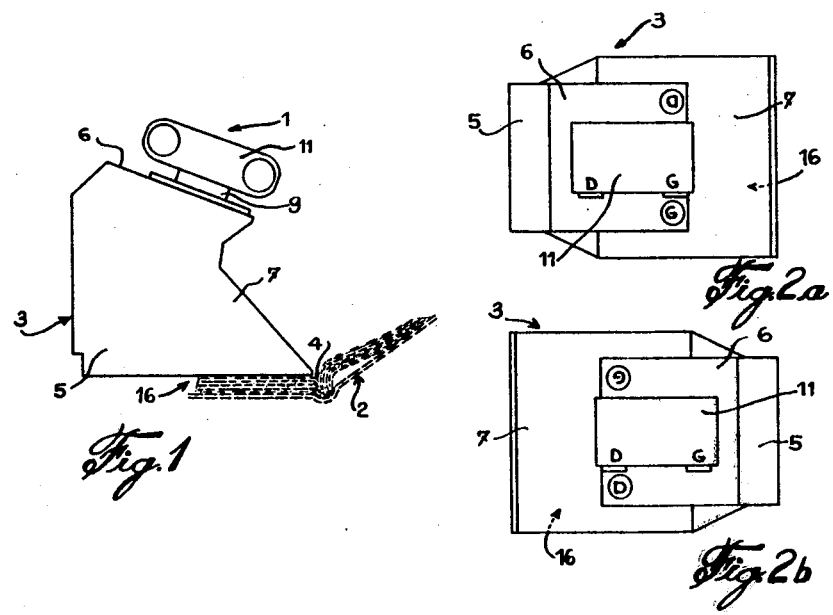
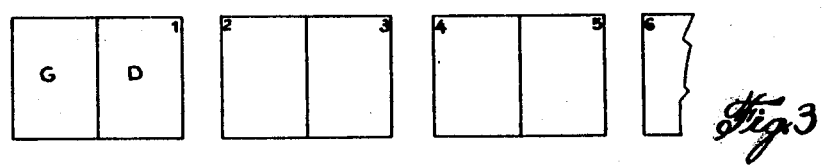
Fig.3
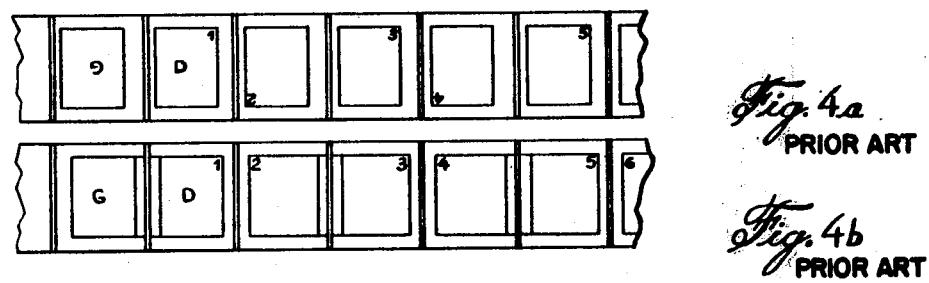
Fig. 4a PRIOR ART
Fig. 4b PRIOR ART
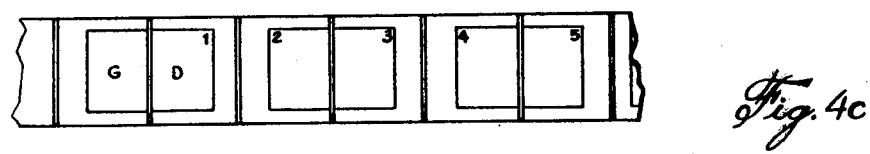
Fig. 4c

METHODS OF AND APPARATUS FOR PHOTOGRAPHING PAGES OF A BOOK

BACKGROUND OF THE INVENTION

The present invention relates to methods of and apparatus for conveniently photographing the pages of a book which is stitched, bound, or more generally, which cannot be completely open so as to present a flat plane with adjacent pages lying substantially in the same plane.

Books, and more particularly old books, are known to be very difficult to photograph, often because the presence of a binding hinders a complete opening of the book and thus does not allow the positioning of the entire surface of each double page in the same plane. Several arrangements are known, which only partially avoid this drawback. For example, it is possible to use a bookrest for holding the book in an open position against a transparent glass plate or to take photographs flat on a document-rest as is done in most photocopying machines. It is also possible to photograph the pages of the book one after another while holding the book in a half-open position at an angle of about 90°. It is also possible to use an apparatus such as that disclosed in U.S. Pat. No. 3,635,557, issued on Jan. 18, 1972 to "The Scholar Press Limited", which discloses apparatus for photographing the page of a book in a half-open position of an angle of about 45°.

The main drawback of the first above-mentioned arrangement lies in that the binding may be damaged or that the photographed text may be unreadable near the internal margins or seam of the book, because of the curvature of the pages near the interval margins.

The main drawback of the two other arrangements is that the adjoining pages of the book which are each photographed on a different picture, or each appear in a different frame, are not disposed and oriented in the same direction on the film which is obtained. Indeed, the pictures obtained on the film are generally dissociated or disposed head to foot because it is necessary to rotate the book for photographing each page.

SUMMARY OF THE INVENTION

An object of the present invention is to provide methods of and an apparatus for photographing the pages of a book which is stitched or bound and which cannot be completely open, which book incurs the above-mentioned drawbacks generally occuring when photographing a bound book.

Another object of the invention is to provide a method for photographing the pages of a book which is stitched or bound, or which cannot be completely open, whereby the relative direction of each picture on the resulting film is maintained as in the book and left and right pages of the book join on the film when the pages do not cover the entire surface of each picture, so that the pages on the film are presented in a more natural manner.

A further object of the invention is to provide a portable, easily operated apparatus for carrying out the method according to the invention, which permits one to easily ascertain when taking each photograph, that the adjoining left and right pages of the book to be photographed are associated in a natural manner on the resulting film.

With the foregoing objects in mind, the instant invention contemplates a method of photographing the pages of a book on at least one strip of film with a camera mounted on a support having a reference line thereon so as to produce an ordered sequence of exposures on the film which follow a sequence of pages in the book. To practice the method, the book is opened to expose a set of first and second, sequential and adjacent pages which are separated by a seam. The first page of the set is aligned with the camera by aligning the reference line of the support with the seam and a photograph is made to produce a first exposure on the film. The second page of the set is then aligned with the camera by aligning the reference line of the support with the seam after effecting a relative rotation of 180° between the book and support. The camera is then rotated 180° relative to the support to maintain relative direction of the film strip and the first page before the second page is photographed. The page is then turned to a subsequent set of pages and the steps repeated.

Apparatus for effecting the afore-described method contemplates a rigid support which comprises a housing and a wedge-shaped hollow member that is alignable with the seam formed between the pages of the book and which rotatably support the camera so that the camera can be rotated 180° after each picture is taken. A set of mirrors for reflecting an image of the book is positioned in the support and a light source is provided for emitting a flashed light beam to illuminate the page upon actuation of the camera.

BRIEF DESCRIPTION OF THE DRAWINGS

The invention will be better understood in the light of the following description with reference to the attached drawings wherein:

FIG. 1 is a schematic side view of an apparatus for photographing the pages of a book according to the invention;

FIGS. 2a and 2b are schematic top views of the apparatus of FIG. 1;

FIG. 3 is a schematic example of the conventional disposition of the pages of a book;

FIGS. 4a and 4b represent various dispositions of photographs pages of a book on a film using various prior art methods;

FIG. 4c represents photographs of book pages obtained in accordance with the methods of the instant invention;

DETAILED DESCRIPTION OF THE DRAWINGS

Figure 5:
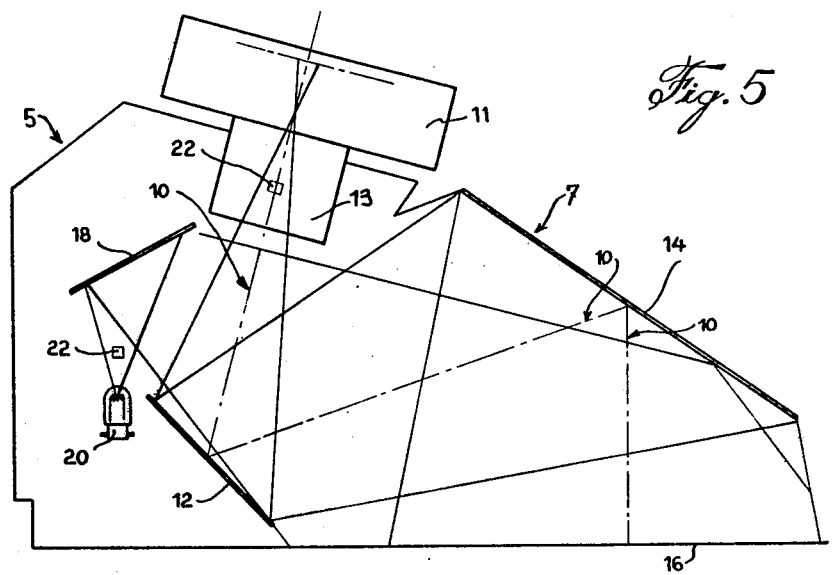
FIG. 5 is a optical diagram of the apparatus shown in FIG. 1.

The method for photographing the pages of a book according to the invention consists in rotating the support of the camera through an angle of 180° relative to the document to be photographed and simultaneously rotating the camera through an angle of 180° relative to its support in the same direction of said support or in the opposite direction, whereby the complete rotation amounts to a rotation of 0° or 360°.

In the field of photography, the method consisting in rotating the camera rather than the document to be photographed for modifying the orientation thereof on the film, is well known. However, such a method is generally used only for modifying the reading direction of what is photographed. It is also known to rotate the camera through an angle of 180° for changing the reading direction of the photographs, when the latter are of the "cine" type, that is, when they are disposed on the film in the advancing direction thereof, such as, for example, in the films used for the movies, or when photographs are of the "comic" type, that is, when they are disposed in a direction perpendicular to the advancing direction of the film, such, forexample, as in comic strips. This method is often used when an easy reading from one photograph to another photograph of a text written in a language reading from right to the left and/or from the bottom to the top, is required.

The method consisting in rotating the book instead of the camera to obtain equivalent results is also well known. This method is used when the camera head does not rotate. The book has then to be turned on the copyboard so that the document-film relationship be properly maintained.

The method according to the invention basically distinguishes from known methods in that it is based on movement of the camera relative to the support for the camera. The rotation of both of these elements through an angle of 180° permits one not only to maintain an identical orientation of all of the photographs on the film, but in addition, to regroup the left and right pages of the photographed documents in their original disposition.

The method, according to the invention, for photographing the pages of a book which is stitched or bound, or which cannot be completely opened with a camera mounted on a support is more especially characterized in that the left pages and the right pages are separately photographed and the support is rotated through an angle of 180° relative to the book to be photographed after each photograph of a page has been taken, while the camera is rotated an angle of 180° in the same direction or in the opposite direction relative to the support. The complete rotation amounts to 0° or to 360°, so as to obtain a single relative orientation of the photographs and a regrouping of the corresponding left and right pages of the book on the film.

The apparatus for carrying out the method according to the invention includes a rigid support comprising a housing and a wedge-shaped hollow member slippable in the angle formed by two pages of a book. The hollow member is provided with an aperture that is applied to the pages to be photographed; a camera with an objective mounted on the housing of the support, so as to rotate either directly an angle of 180° or 360° about an axis corresponding to the optical axis of the objective, or indirectly by means of a system for inverting an angle of 180° or 360° the photograph to be taken relative to the optical axis of the objective. The objective is disposed so as to indirectly photograph through a set of mirrors the plane of the aperture of the hollow member in a direction substantially perpendicular thereto. A light source is located in the housing and adapted to provide a flash type light beam in the direction of said aperture upon actuation of the camera.

This apparatus can further include a photoelectric adjusting cell, framing means for aligning the photographs with respect to one another along the film, and control means for checking the relative position of the various elements with respect to one another.

According to a particular embodiment of the invention, the apparatus is provided with easily interchangeable wedge-shaped hollow members which can be easily substituted for other hollow members of larger or smaller sizes depending on the size of the page of the book to be photographed or of the desired reduction ratio.

Referring now to the drawings and specifically to FIG. 1, an apparatus 1 for photographing the pages of the book 2 comprises a camera 11 and a support or enclosure 3 which includes a housing 5 and a wedge-shaped hollow hood member 7 insertable in the crease, angle or seam 4 formed between two pages of a book 2. The camera 11 is maintained in front of a first opening in the enclosure 3 made through the upper surface 6 of the housing of the apparatus 1 by means of a turret 9 having two different functions. Firstly, the turret 9 permits one to hold the camera 11 in position over the housing 5 in a removable manner. Secondly, the turret 9 permits one to rotate the camera 11 about an axis 10 of its objective 13 as is shown in FIG. 5 in order to rotatably index the camera through one hundred eighty degree intervals. A more precise description of an embodiment of this turret 9 will be given hereinafter.

The angle of the wedge-shaped part of the hollow hood member 7 is selected so as to enable photography of a book which cannot be completely opened flat because of its binding. This angle generally ranges between 30° and 80° but smaller or greater angles may be used depending on the kind of book to be photographed. In this connection, it is to be noted that the apparatus for photographing the pages of book according to the invention is not restricted in its functions to a particular design or a given use.

The camera 11 is preferably a camera of the reflex type with a given aperture and a fixed focus, or a miniature camera adapted to take 8mm or 16mm frames or 35mm half frames (18×24) or a modified camera adapted to this specific work.

As is shown in FIG. 5, the objective 13 of the camera 11 is oriented so that its optical axis 10 is perpendicular to the plane of a second opening in the enclosure 3 which is an aperture 16 made in the hollow hood member 7. This perpendicular orientation results from the arrangement of two mirrors 12 and 14 facing one another inside the housing 5 and the hood 7. The two mirrors reflect the image of the page of the book to be photographed from the mirror 14 to the mirror 12 and then to the objective 13. The mirror 14 is generally in a fixed position in correspondence with the aperture 16, while the mirror 12 is adjustable to permit an accurate framing of the image reflectd by the mirror 14 relative to the axis 10 of the objective 13. This adjustment of mirror 12 can be made, for example, by means of a slider, or semi-automatically as will be described hereinafter.

A light source 20 is mounted within the housing 5 and projects a light beam in the direction of the page of the book to be photographed, that is, in the direction of the aperture 16. In order for the apparatus 1 be more compact and therefore more handy, the light source 20 is disposed so as to indirectly light the page to be photographed through a mirror 18. The light beam reflected by the mirror 18 can light the page of the book either directly, or after reflection on the mirror 14. The mirror 18 is preferably adjustable to permit a framing of the light beam relative to the aperture 16. This adjustment can be made for example by means of an adjusting slider, or semi-automatically, simultaneously with the adjustment of mirror 12. In essence, the mirrors 14 and 18 and the light source 20 function as a projector within the support 3 for projecting an image of a book page through the objective of the camera 11.

The light source 20 is preferably an electronic computerized flash connected to a current supply source, not shown, so that the apparatus 1 is fully autonomous. However, the light source 20 can also be permanently installed in the apparatus and supplied with A.C. current.

The apparatus 1 may advantageously include a photoelectric cell 22 for adjusting the aperture of the objective or, when using an electronic computerized flash, for varying the lighting relative to the quantity of reflected light and the sensitivity of the film used in order to control exposure of the film. The photoelectric cell 22 can be oriented either directly in the axis 10 of the objective 13, as in most automatic or semi-automatic cameras, or indirectly in the axis of the light beam emitted by the light source 20, such as, for example, near the light source 20.

The various advantages of the method and apparatus for photographing the pages of a book according to the invention are clearly shown in FIGS. 3 and 4.

FIG. 3 schematically represents the first pages of an opened book with a left page generally numbered with an even number (0, 2, 4, 6, . . .) and corresponding right page numbered with an odd number (1, 3, 5, . . .).

When using a camera with a given aperture and a fixed focus, a book can be photographed page after page, in a half-open position, such as at an angle of 90° or more, or by using an apparatus as described in the previously mentioned U.S. Pat. No. 3,635,557. The first method, when possible because the presence of a tied gum or stitched binding, is time consuming and tedious and generally requests the presence of an assistant. The second method is faster but results in the obtention of improper photographs showing successively a page head upwards and a page head downwards, as schematically shown in FIG. 4a. The method for photographing the pages of a bound book, according to the instant invention, permits one not only to photograph the pages separately, but also to regroup them in their normal position. The double movement of rotation of 180° of the camera and of its support as shown in FIGS. 2a and 2b permits one to orientate all the photographs of the pages on the film in a single direction and to obtain a regrouping effect as is shown in FIG. 4c. As can be seen, the method according to the invention thus permits one to eliminate the drawbacks of the prior art in which photographs on the film are alternately inverted, pages are photographed out of center with respect to the frame of each photograph of left and right pages, and distortion appears near the inside margins because of the binding.

For a better understanding of the operation of the instant invention, mention will not be made of the change in orientation of the photograph as seen and photographed due to the presence of the objective or of the advancing direction of the film which depends only on the camera. Furthermore, mention will not be made of the starting point of the film permitting one to regroup the left pages with the right pages as they should be.

The apparatus 1 is first aligned with a left page G (FIG. 3) of the book to be photographed. The apparatus 1 is disposed as shown in FIG. 1, so that the page G is facing the aperture 16 of the hollow member 7. The page G is then framed with respect to the aperture 16 in order that all of the photograph will be well aligned on the film, one beside the other and not offset with respect to the axis of the film. Framing can be accomplished by a single adjustment of the book with respect to the apparatus 1 by means of, such as the graduated rule 15 shown in FIG. 6, visibly disposed on the lateral side or the upper surface of the hollow member 7. Such an aligning method is conventional and commonly used in most photocopying apparatus.

The camera 11 is afterwards rotated on the support 3 depending on the position of the latter.

In order to facilitate the manipulation of the apparatus 1, means for controlling or indicating the relative position of the camera 11 with respect to the support 3 can be provided. Such control means may consist of superimposable, identical or corresponding symbols, indicia, codes, colors, letters or words, respectively figuring on the camera 11 and the support 3 to display relative rotational positions. This can be, for example, the letter G for the left page and the letter D for the right page, as illustrated in FIGS. 2a and 2b, but, of course, any other symbols could be selected. The operator then rotates the camera 11 with respect to the support 3 so as to bring into coincidence or to superimpose the corresponding symbols, so as to adjust the whole system in a single operation. In this connection, it should be noted that no error can be made if two specific and determined positions are provided for the camera, in which positions the G figuring on the camera coincides with the G figuring on the support and/or if the D figuring on the camera coincides with the D figuring on the support, since the respective positions of both of these two elements are always the same in a given position.

When using a film with a given sensibility, the adjustment of the aperture for a correct exposure needs to be made only once. The various corrections which may be necessary are automatically effected by the photoelectric cell 22 connectd to the electronic computerized flash 20 (see FIG. 5).

When the left page G has been photographed, the support 3 is rotated as shown in FIG. 2b so that page D coincides with the aperture 16 of the hollow member 7, and the above-mentioned photographing operation is started again.

There is a simple variant to the above-described method for photographing the pages of a book, based on a double rotation of the camera 11 and the book 2 rather than rotation of the camera and the support 3.

This variant is particularly advantageous when the apparatus 1 is provided with an aperture and hollow member of large size, since, in the latter case, it is simpler to rotate the book 2 rather than the whole apparatus.

Figure 14:
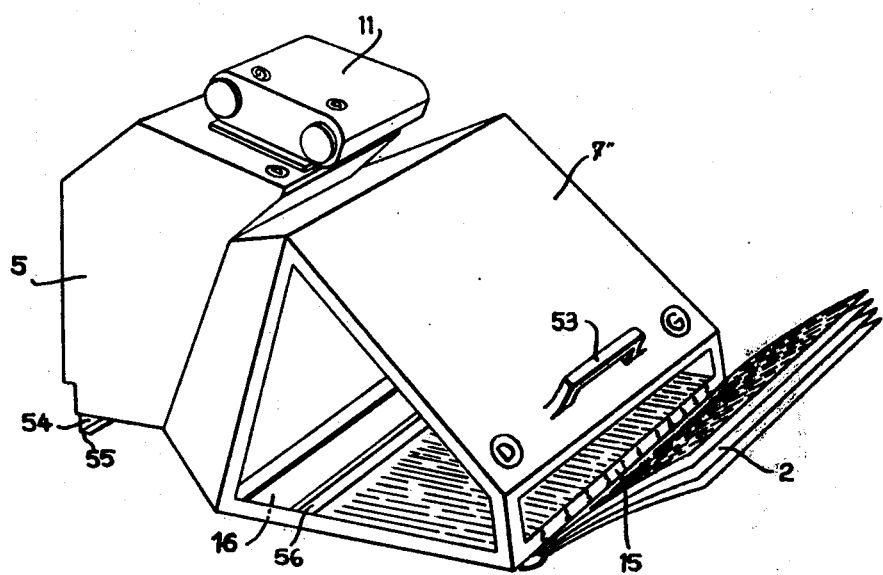
FIG. 14 is a perspective view of another embodiment of the apparatus of the invention which carries out a variant method according to the invention.

Referring to FIG. 14, it can be seen that the respective position of the camera 11 with respect to its support can also be controlled by superimposition or correspondence of symbols when carrying out the above-mentioned variant. However, in this case, the head of the pages to be photographed must correspond to the lateral side of the apparatus where there is superimposition or correspondence of a given symbol such as, for example, the symbol G.

In order to facilitate the manipulation, a handle 53 can be fixed onto the hollow member 7 for lifting the same and thus easily sliding the document to be photographed under the aperture of the hollow member. In this case, the apparatus rests on an edge 54 of the housing 5.

In order to obtain a better framing of the document to be photographed which is, for example, a book with a rather thick edge, use can be made of an adjustable extensible stand 55 for placing the apparatus 1 exactly at the level of the plane of the page to be photographed.

Such an arrangement permits one to obtain not only a better stability of the support but also, inside said support comprising the housing and hollow member, a less level light beam, a smaller and therefore less cumbersome mirror and, of course, a clearance under the apparatus which can be very useful when taking photographs.

When carrying out the above-mentioned variant, use can be made of a slidable rod 56 applied to the external margin of the page to be photographed for holding the same in flat position. The rod 56 is of particular interest when the page of the book to be photographed is smaller than the aperture of the hollow member 7.

The variant of the method for photographing the pages of a book according to the invention is carried out as follows.

The hollow member 7 with its aperture 16 is first lifted by handle 53, after adjustment of the extensible stand 55, if necessary. The book to be photographed is then placed under the aperture 16. The slidable rod 56 is moved so as to be in cooperative relationship with the external margin of the page of the book to be photographed and turret 9 (see FIGS. 11 and 12) supporting the camera 11 is released so as to rotate the camera 11 and superimpose or bring in correspondence the control means corresponding to the head of the page to be photographed.

According to a particular embodiment of the invention, the wedge-shaped hollow member 7 to be inserted in the angle formed between two pages of the book 2 is removable and can be easily substituted for by other hollow members of smaller or bigger sizes depending on the size of the book to be photographed.

The possibility of substitution of the hollow member 7 is particularly advantageous in that it permits one to change or reduce the size of the surface to be photographed while ensuring a quite good lighting inside the housing and a better framing of each photograph by mere alignment of the wedge-shaped corner of the hollow member 7 relative to the book to be photographed.

Figure 6:
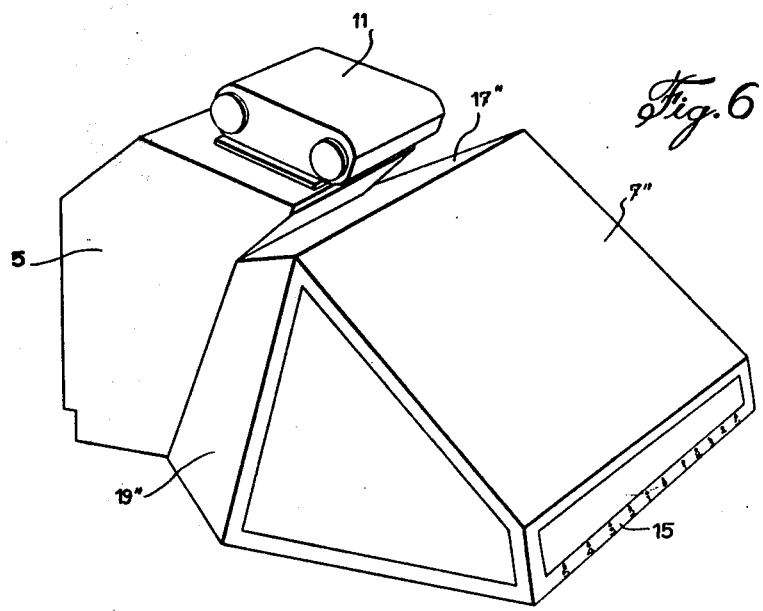
FIG. 6 is a perspective view of another apparatus according to the invention wherein a hollow hood member is utilized which is interchangeable and is relatively large.
Figure 7:
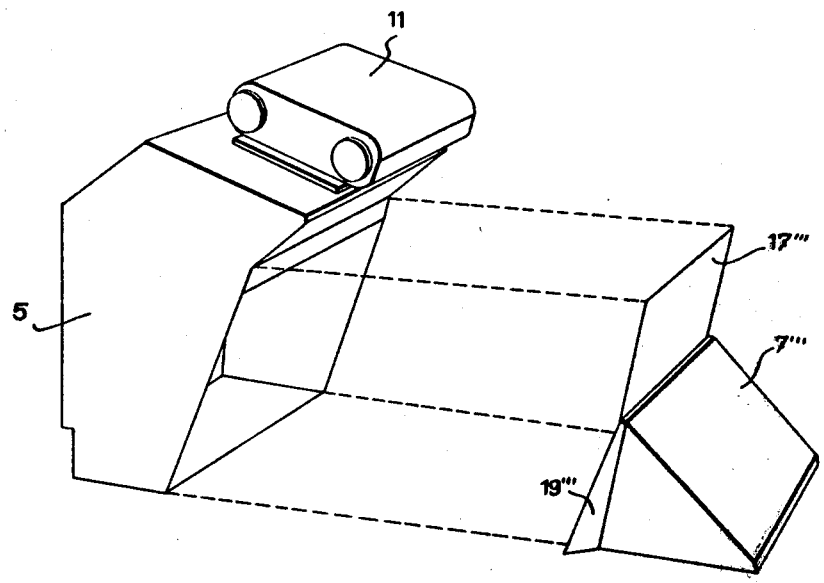
FIG. 7 is a perspective view of the apparatus shown in FIG. 6 with a relatively small, hollow hood member in open position.
Figure 8:
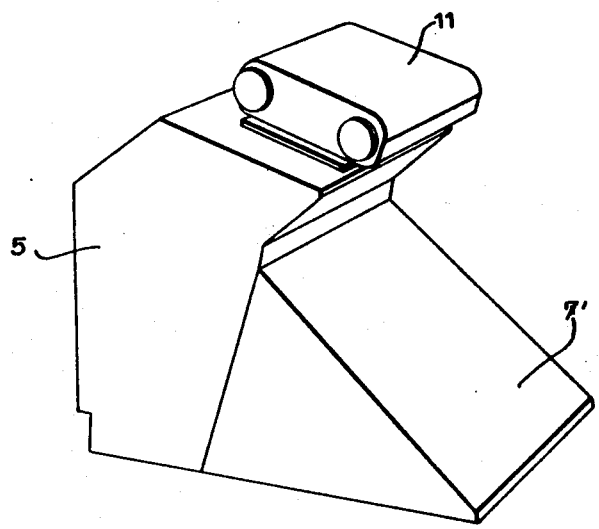
FIG. 8 is a perspective view of the apparatus of FIG. 6 with a hollow hood member of medium size.

FIGS. 6, 7 and 8 respectively represent an apparatus according to the invention provided with a hollow member 7" for photographing pages of larger size, a hollow member 7'" for photographing pages of smaller size and a hollow member 7' for photographing pages of medium size. The shape of each of these hollow members is preferably selected depending on the usual, eventually standard formats of the books or documents to be photographed. However, it is obvious that any dimensions can be used.

The objective 13 of the camera 11 is also removable. However, a change thereof is not always necessary. Use can be made, for example, of a large aperture and reduced objective for photographing document of small sizes. In many instances, this will be the best way to keep the same reducing ratio. The removable objective, if used, should be selected depending on the opened field or dimension of the hollow member 7, the distance from the film to the document. The focus and diaphragm of the camera 11 can be advantageously preadjusted by means of marks which are only used when appropriate objective is fitted onto the camera.

All of the hollow members 7, 7', 7", 7'", ... are adapted to be mounted on a same housing 5.

When the apparatus 1 is used for photographing pages of small size, the hollow member 7'" is externally extended by two lateral and vertical joining panels 17'" and 19'" as shown in FIG. 7.

When the apparatus 1 is used for photographing pages of large sizes, the hollow member 7" is internally reduced by lateral and vertical joining panels 17" and 19, as shown in FIG. 6.

Advantageously, these various hollow members are designed so as to be encasable one inside each other so as to occupy the smallest possible volume. For this purpose, the joining panels 17'" and 19'" could be removed from the hollow member 7'", if necessary.

Figure 9:
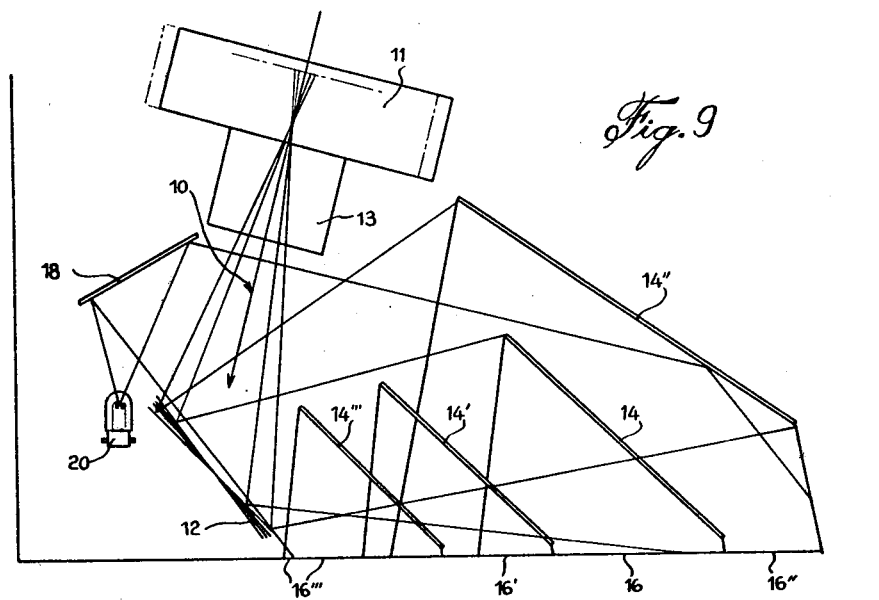
FIG. 9 is an optical diagram of the various sized apparatus shown in FIGS. 6, 7 and 8.

The photographical advantages resulting from the use of such removable hollow members is clearly shown in FIG. 9.

Figure 10:
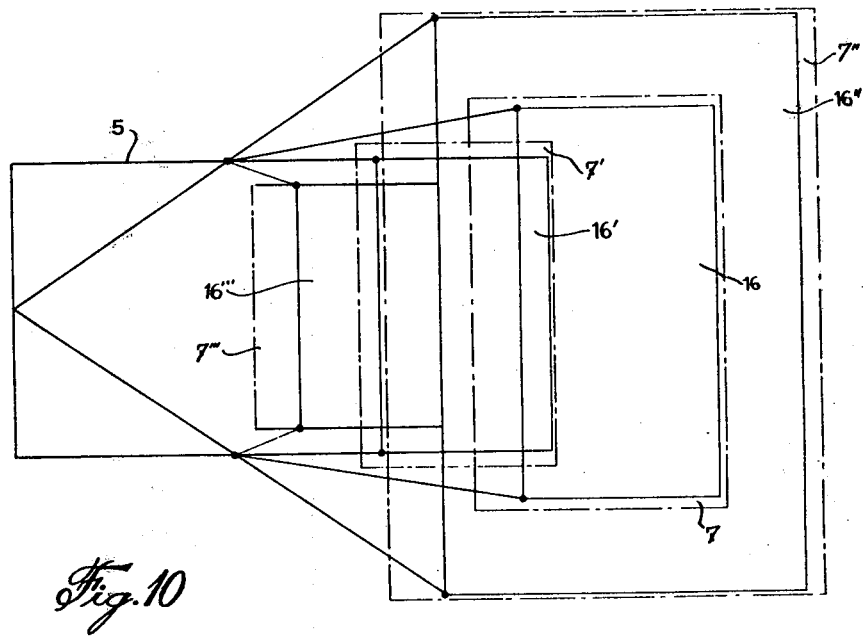
FIG. 10 represents the respective sizes of apertures of hollow hood members shown in FIGS. 6, 7 and 8 depending on the sizes of the members.

For each hollow member 7, 7', 7", 7'", ... provided with a mirror 14, 14', 14", 14'", ..., respectively, a corresponding aperture 16, 16', 16", 16'", ... is used. Of course, the size of each aperture 16, 16', 16", 16'", ... depends on the size of the hollow member 7, 7', 7", 7'", ... as can be seen in FIG. 10.

Such a system of removable hollow members permits one to easily and quickly adapt the apparatus according to the invention to the format of the book 2 to be photographed.

The camera 11 which is used can be a conventional, commercially available camera with a film advancing lever, a shutter-release button and, optionally a finder eye-piece for seeing the document to be photographed. the latter being actually not necessary for adjusting the document. The shutter-release button is connected to the light source so as to synchronize the lighting and the photgraphic operation. It should be noted that when the camera 11 is provided with a finer eye-piece and has been adjusted for one book, it is no longer necessary to use the eye-piece for each additional photograph.

The preferred camera is a camera sold under the trademark ALPA, which camera is provided with two contact pins asymmetrically disposed on each side of the objective. Such an apparatus, owing to its structure, can be very quickly mounted onto the support 3 and automatically connected to the flash and/or to an automatic film advancing and shutter-release system. This type of camera is provided with a manual, step-by-step winding mechanism for advancing the strip of film therewithin.

Figure 11:
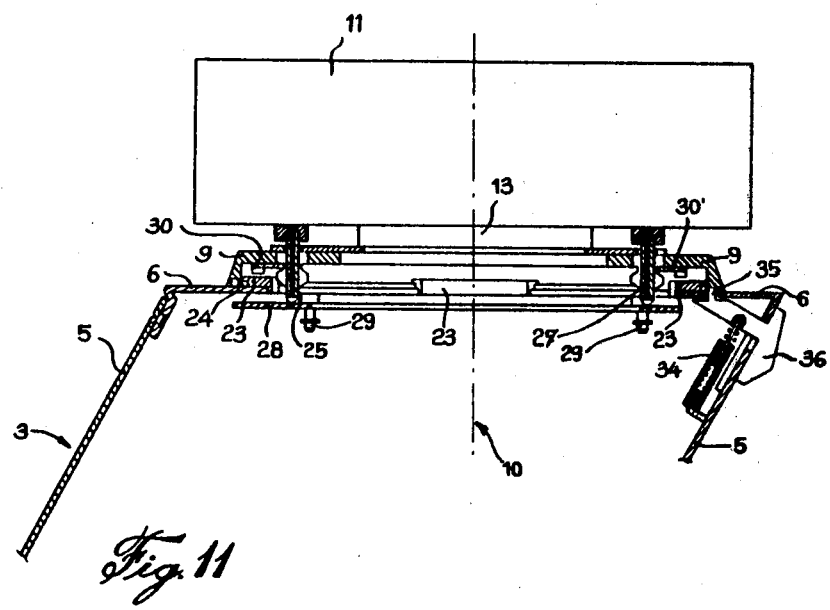
FIGS. 11 and 12 are side and top elevations of embodiments of turrets which can be used for mounting the camera on the housing of an apparatus according to the invention.
Figure 12:
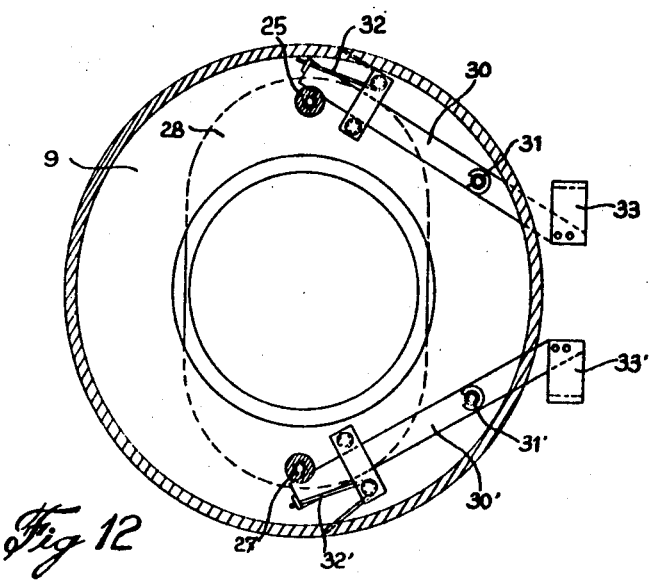

An embodiment of the turret 9 used for holding the camera 11 on its support 3 is illustrated in FIGS. 11 and 12.

According to this embodiment, the turret 9 is held on the upper surface 6 of the housing 5 by means of a fixing system provided with four fasteners 23 disposed around an aperture through the housing 5 for which receives the objective 13. The four fasteners 23 fixed to the upper surface 6 engage a molding 4 extending along the inside periphery of the turret 9. This engagement permits one to simultaneously hold the turret 9 on the housing 5 and to rotate the turret about the axis 10 of the objective 13 of the camera 11.

The camera 11 is positioned and fixed onto the turret 9 by means of two contact pins 25 and 27 asymmetrically disposed on each side of the objective 13. The contact pins 25 and 27 are introduced into corresponding holes provided within the turret 9 and held in position by means of two blades 30 and 30' engaging two slots provided in the contact pins for this purpose. Each blade 30 or 30' rotates about an axis 31 or 31' and is held in "closed" position by a spring 32 or 32'. For disengaging the camera 11 from the turret 9, the ends 33 and 33' of the blades 30 and 30' need only be pinched for releasing the contact pins 25 and 27.

The contact pins 25 and 27 permit one to automatically establish an electronic contact between the flash and/or the automatic advance and shutter-release system when positioning the camera 11. When the camera 11 is positioned each of the pins contact a rigid disc 28 mounted on the housing 5 which is provided with plurality of concentric strips (not shown) made of conducting materials connected to the flash and/or shutter-release button mounted on the housing 3. In order to ensure the best electrical contact, the disc 28 is preferably mounted on a spring system 29.

It is obvious that such an arrangement permits to use as many electronic contacts as necessary.

A positioning button, not shown, corresponding to a hole or an eyelet on the disc 28 of the apparatus 1 can be mounted on the turret 9 so that the camera 11 is always positioned at the right place on its support and the axis of the objective 10 is always identically oriented.

As mentioned before, the turret 9 has two different functions. Firstly, it permits one to hold in position the camera 11 over the housing 5 in a removable manner. Secondly, it permits one to rotate the camera 11 about the axis 10 of its objective 13.

The turrent is locked in operative position by means of a conventional locking system comprising a button 36 held in position by a compression spring 34 and provided with a tooth 35 engaging in a corresponding hold in the support of the turret 9 so that rotation of the camera 11 is indexed through one hundred eighty degree intervals.

The camera 11 can also be locked in predetermined positions by means of a conventional manual, or automatic, locking system, or by means of ball frictioning system.

The turret 9 is preferably and advantageously unlocked by means of a lever mounted beside the apparatus. This latter arrangement permits one to unlock and simultaneously rotate the camera 11 by a single and simple pressing and rotating movement which can be made using only one hand which, therefore, considerably facilitates handling of the apparatus 1 after taking each photograph.

Such a simplification is very important since the rotation of the objective through 180°, which is necessary before taking each photograph, can be surely and easily made only if the camera is well positioned before and after each rotation thereof.

Figure 13:
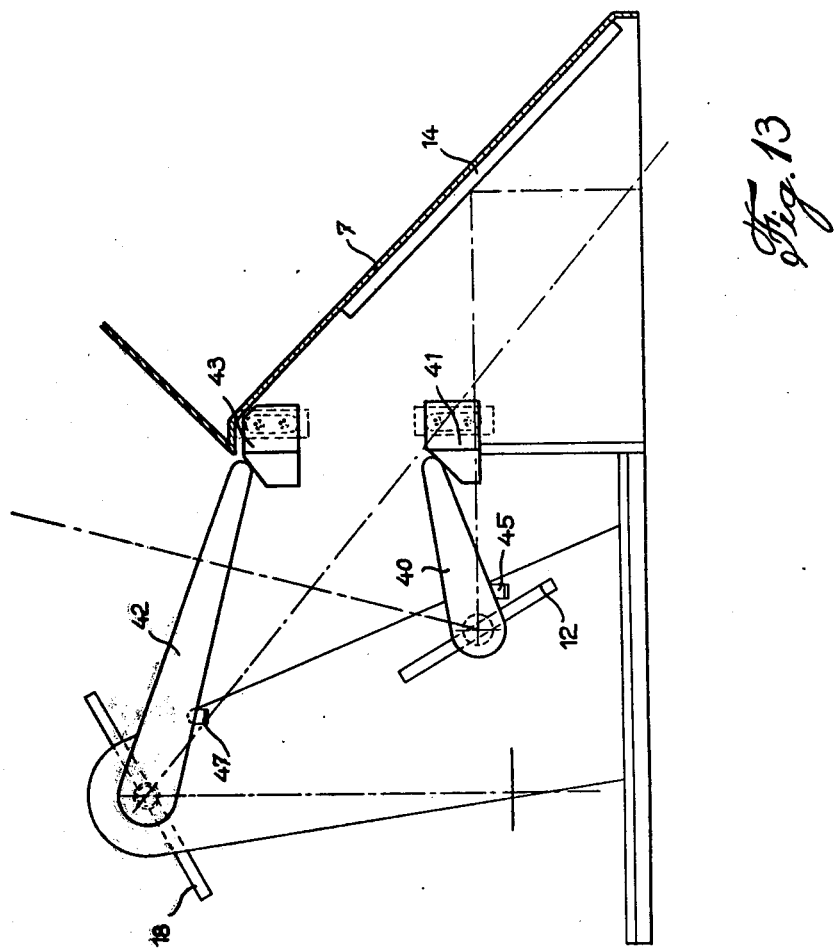
FIG. 13 is a side view of a system for semi-automatically positioning mirrors when using an apparatus provided with several interchangeable hollow members.

As mentioned before, when using a plurality of removable members of different sizes, use can be made of a very simple system for semi-automatically orientating the mirrors 12 and 18 reflecting the image of the page of the book to be photographed and the light beam of the flash, respectively. Such a system is best illustrated in FIG. 13.

This system includes two levers 40 and 42 respectively mounted on the mirrors 12 and 18. The two levers 40 and 42 permit one to simultaneously and automatically adjust the orientation of the mirrors 12 and 18 by mere contact at the desired level with two adjustable stops 41 and 43 respectively, mounted on each removable hollow member 7 at a location which depends on the position and the size of the mirror 14 located therein. Two other stops 45 and 47 and two springs, not shown, are used for maintaining the mirrors and the levers in steady position.

It should be noted that the respective positions of the various elements forming the structure of the apparatus for photographing the pages of a bound book according to the invention are selected to balance at the best the weight of the apparatus when operating the latter. In this regard, it is not necessary that the distribution of the weight be perfect since the apparatus 1 is well supported by the part of the book on which the aperture of the hollow member 7 lies and by the hands of the operator.

In practice, use is preferably made of films of high contrast for reproducing documents. Of course, the dimensions of the film depend on the sizes of the documents to be photographed and on the transformation to be effected on the film for obtaining either a roll, a jacket, or a microfiche.

In the above description, mention has only been made of the simpler disposition of the exposure on the film known under the name "Simplex" frame, in which the photograph of each page of the book extend approximately over the entire width of the film.

According to a variant, the same result can be obtained when using another disposition of the photographs on the film, known under the name of "Duplex" frame, in which the photographs of the left and right pages of a same book extend side by side on the width of the film (half-frame).

To obtain the latter disposition, use can be made of a mask fixed onto the housing of the apparatus and provided with an aperture having the size of one half-frame.

When the camera is rotated an angle of 180° with respect to the housing and a photograph is taken, only one-half photograph is exposed and it is therefore possible to regroup on the same photograph the left pages and the right pages of a book. Of course, in this case, the advance of the film can only be made after each photograph has been completed, that is after two exposures.

From a practical point of view, the axis of the objective can pass through the center of the half-frame or through the center of the complete frame depending on the possibilities of the objective and its field.

To obtain two pages side by side either on the width of the film (half-frame) or the length of the film (full frame), it is enough to rotate the film and therefore the camera through an angle of 190° relative to the support of the housing of the apparatus.

It is obvious that such a variant, including a mask, a rotation of the camera of 180° and a relative modification of the advancing direction of the film can also be obtained by means of optical devices, such as sets of mirrors, prisms, or the optical means associated to the movement of the mask rather than to the rotation of the film.

I claim:

1. A method of photographing the pages of a book on at least one strip of film with a camera mounted on a support having a reference line thereon so as to produce an ordered sequence of exposures on the film which follow a sequence of pages in the book, comprising the steps of:
   (a) opening the book to expose a set of first and second, sequential and adjacent pages separated by a seam,
   (b) aligning the first page of the set with the camera by aligning the reference line of the support with the seam,
   (c) photographing the first page to produce a first exposure on the film,
   (d) aligning the second page of the set with the camera by aligning the reference line of the support with the seam after effecting a relative rotation of 180° between the book and the support,
   (e) rotating the camera 180° relative to the support to maintain the relative direction of the film strip and the first page, and
   (f) photographing the second page to produce an exposure on the film strip adjacent to the first exposure and oriented in the same direction as the first exposure.

2. The method of claim 1 further including the steps of:
   (g) turning the page of the book to expose a subsequent set of first and second, sequential and adjacent pages separated by a seam;
   (h) repeating steps b through f to produce a subsequent set of first and second exposures on the film strip which follow the first and second exposures to produce the ordered sequence of exposures wherein the exposures are all oriented in the same direction.

3. The method of claim 2 wherein steps a) through h) are repeated to photograph a plurality of sets of pages.

4. The method of claim 1 wherein in step d) and book remains stationary and the support is rotated.

5. The method of claim 1 wherein in step d) the support remains stationary and the book is rotated.

6. Apparatus for photographing the pages of a book sequentially as the pages occur in the book with a camera having a strip of film therein which is indexed to sequentially register with an objective lens for providing a sequence of exposures, the apparatus comprising:
   a support having a first opening for registration with a page being photographed and a second opening in fixed relation to the first opening for registration with the objective lens of the camera;
   lighting means within the support for illuminating the page being photographed and for exposing the film;
   mirror means within the support for reflecting a beam of the light from the lighting means to the page and for reflecting an image of the page through the objective of the camera with the beam of light;
   framing means for aligning the first opening of the support with a book seam adjacent to the page to be photographed;
   means for mounting the camera on the support to rotate about the axis of the objective lens while the objective lens is registered with the second opening;
   means for indexing rotation of the camera through one hundred eighty degree intervals, whereby when the support and book are rotated one hundred eighty degrees with respect to one another to realign the framing means with the book seam in order to photograph an adjacent page, the film in the camera is rotated one hundred eighty degrees upon rotatably indexing the camera through one hundred eighty degrees so that the image of the adjacent page is oriented the same as that of a previously photographed page; and
   indicating means on the support for aligning with indicating means on the camera to display the relative rotational position of the camera with respect to the support and therefore with respect to the orientation of the framing means and book.

7. Apparatus as claimed in claim 6, further comprising a photoelectric cell aligned with the axis of the objective for controlling exposure of the film.

8. The apparatus of claim 6 wherein the support is an enclosure which includes a hood member and a housing wherein the hood member has the framing means thereon and the housing supports the camera.

9. Apparatus as claimed in claim 8, wherein the framing means includes a graduated rule visibly disposed on a lateral side of the support.

10. Apparatus as claimed in claim 8, wherein the set of mirrors comprises a first mirror fixed within the hood member and a second adjustable mirror located inside the housing.

11. Apparatus as claimed in claim 10, wherein the light beam emitted by the light source is reflected by at least one mirror before reaching the aperture of the hood.

12. Apparatus as claimed in claim 11, further comprising a photoelectric cell aligned with the axis of the light beam emitted by the light source for controlling exposure of the film.

13. Apparatus as claimed in claim 12, wherein the hood member is interchangeable with other interchangeable hood members of larger or smaller sizes depending on the size of the page of the book to be photographed.

14. Apparatus as claimed in claim 13, wherein the adjustable mirror and the light beam reflecting mirror are both connected to levers which when rotated orient the mirrors and wherein each interchangeable hood member comprises two stops which engage said levers to rotate said levers and automatically adjust the orientation of the adjustable mirror and light beam reflecting mirror to accommodate the size of the corresponding aperture.

15. Apparatus as claimed in claim 8, further comprising a mask fixed on the housing and provided with an aperture having the size of one-half a film frame for regrouping on the same photograph adjacent pages of the book.

16. The apparatus of claim 8 wherein the hood member is interchangeable with other interchangeable hood members of larger or smaller sizes having larger or smaller first openings depending on the size of the page of the book to be photographed.

17. The apparatus of claim 16 further including levers connected to the adjustable mirror and the light beam reflecting mirror which levers when rotated orient the mirrors, and further including two stops on the interchangeable hood members which engage the levers to rotate the levers to adjust automatically the orientation of the adjustable mirror and light beam reflecting mirror to accommodate the size of the corresponding first opening.

18. The apparatus of claim 6 wherein the indicating means are visual symbols on the support and camera which are brought into registration upon rotating the camera on the support and which indicate correct and incorrect rotational orientation.

19. The apparatus of claim 6 wherein the framing means includes a graduated scale for alignment with the seam of the book.

20. The apparatus of claim 8 wherein the framing means includes a graduated rule visibly disposed on an upper surface of the hood.

21. Apparatus for photographing the pages of a book sequentially comprising:
a camera having a strip of film therein which is indexed to sequentially register with an objective lens for providing a sequence of exposures;
a support having a first opening for registration with a page being photographed and a second opening in fixed relation to the first opening for registration with the objective lens of the camera;
lighting means within the support for illuminating the page being photographed and for exposing the film;
mirror means within the support for reflecting a beam of the light from the lighting means to the page and for reflecting an image of the page through the objective of the camera with the beam of light;
framing means for aligning the first opening of the support with a book seam adjacent to the page to be photographed;
means for mounting the camera on the support for rotation about the axis of the objective lens while the objective lens is registered with the second opening;
means for indexing rotation of the camera through one hundred eighty degree intervals whereby when the support and book are rotated one hundred eighty degrees with respect to one another to realign the framing means with the book seam in order to photograph an adjacent page, the film in the camera is rotated one hundred eighty degrees upon rotatably indexing the camera through one hundred eighty degrees so that the image of the adjacent page is oriented the same as that of a previously photographed page; and
indicating means on the support for aligning with indicating means on the camera to display the relative rotational position of the camera with respect to the support and therefore with respect to the orientation of the framing means and book.

22. The apparatus of claim 21 wherein the support is an enclosure which includes a hood member and a housing, and wherein the hood member has the framing means thereon and the housing supports the camera.

23. The apparatus of claim 22, further comprising a photoelectric cell aligned with the axis of the light beam emitted by the light source for controlling expousre of the film.

24. The apparatus of claim 21 wherein the camera is provided with a manual step-by-step winding mechanism for advancing the strip of film.

25. Apparatus for sequentially photographing the pages of a book wherein the pages are joined by a seam and wherein a camera is utilized in which a strip of film is indexed past an objective, the apparatus comprising:
a support structure;
means for mounting a camera on the support structure, the mounting means including:
means for rotatably indexing a camera mounted on the support structure through one hundred eighty degree intervals with respect to the support structure about the axis of the objective of the camera;
projection means within the support structure for projecting an image of a page to a camera mounted on the support structure; and
means on the support structure for aligning the support structure with the seam of a book to frame a page of the book.

26. The apparatus of claim 25 further comprising:
indicating means on the support structure for displaying the rotating orientation of a camera with respect to the support structure.

* * * * *